United States Patent [19]
Krahl

[11] Patent Number: 5,541,500
[45] Date of Patent: Jul. 30, 1996

[54] POWER SUPPLY ARRANGEMENT COMPRISING A DIRECT VOLTAGE MONITORING CIRCUIT

[75] Inventor: Burghard Krahl, Leinburg, Germany

[73] Assignee: U.S. Philips Corporation, New York, N.Y.

[21] Appl. No.: 714,582

[22] Filed: Jul. 16, 1990

[30] Foreign Application Priority Data

Jul. 18, 1989 [DE] Germany ............................ 39 23 710.9

[51] Int. Cl.$^6$ ............................................. G05F 5/08
[52] U.S. Cl. .......................... 323/299; 323/276; 323/303
[58] Field of Search ..................................... 323/274, 276, 323/277, 278, 299, 303, 312, 315, 231; 307/318

[56] References Cited

U.S. PATENT DOCUMENTS 4,063,302  12/1977  Donig ........................................ 361/90

FOREIGN PATENT DOCUMENTS 3303248  8/1984  Germany ............................... 323/231
3707973  9/1988  Germany .

Primary Examiner—Peter S. Wong
Assistant Examiner—Adolf Berhane
Attorney, Agent, or Firm—Bernard Franzblau

[57] ABSTRACT

Power supply arrangement comprising a direct voltage monitoring circuit. A power supply arrangement comprising a direct voltage monitoring circuit for at least two different-polarity direct voltages connected to a common reference potential, and including a signal transmission element. The monitoring circuit arrangement has an enhanced accuracy of response with limited circuitry and cost. A series connection of a zener diode and a resistor is connected in shunt with each direct voltage. The junction point of each zener diode and resistor is connected to the base of a transistor. A first electrode of each transistor is connected to the signal transmission element and a second electrode.

21 Claims, 2 Drawing Sheets

POWER SUPPLY ARRANGEMENT COMPRISING A DIRECT VOLTAGE MONITORING CIRCUIT

BACKGROUND OF THE INVENTION

This invention relates to a power supply arrangement comprising a monitoring circuit for no less than two different-polarity direct voltages connected to a common reference potential, and including a signal transmission element.

Power supply arrangements comprising monitoring circuits are necessary, for example, for protecting the connected users against overvoltages in the case of failure or, in the case of undervoltages avoiding the transfer of faulty data are transferred without such transfer being timely recognised. Consequently, the failure of a direct output voltage, i.e. the deviation from a predetermined set value, is to with certainty be indicated by means of a signal transmission element so that safety measures can be taken. If a failure occurs in a secondary circuit, especially in a clocked power supply arrangement, the direct output voltages are accordingly adjusted or switched off by means of adjusting elements provided in the primary circuit. If electric isolation of the secondary circuit and the control circuit operating, for example, in the primary circuit of a transformer is necessary, a signal transmission element with electrically isolated inputs and outputs, for example, an optocoupler, is used for transmitting the control signals of the monitoring circuit.

In DE-A 37 07 973 there is disclosed a power supply arrangement comprising an overvoltage protection circuit and a signal transmission element. In this arrangement a series connection of a zener diode and a diode is inserted between a reference potential and each direct output voltage which is positive or negative with respect to this reference potential. A signal transmission element, arranged as a light-emitting diode optocoupler is inserted between the zener diode and the diode of either one of the two series connections. If no overvoltages occur, the zener diode will be blocked and the light-emitting diode will not emit. If an overvoltage occurs in a direct output voltage, the zener diode concerned will conduct and power will flow through the light-emitting diode of the signal transmission element. The accuracy of response of the signal transmission element and thus of the overvoltage protective circuit is then determined by the tolerances of a plurality of different modules, i.e. more specifically, by the tolerances of the diode, the zener diode, the signal transmission element and a dropping resistor connected in series thereto and thus has insufficient accuracy of response when more stringent requirements are involved.

SUMMARY OF THE INVENTION

It is an object of the invention to provide a power supply arrangement comprising a monitoring circuit of the type mentioned in the opening paragraph, in which the monitoring circuit has enhanced accuracy of response whereas, on the other hand, the circuitry remains simple.

This object is achieved by means of a power supply arrangement comprising a monitoring circuit of the type mentioned in the opening paragraph, in that a series connection of a zener diode and a resistor is shunted to each direct voltage, with the junction point of each zener diode and resistor being connected to the base of a transistor. A first electrode of each transistor is connected to the signal transmission element and a second electrode to the respective positive or negative pole of the direct voltages.

Other advantageous embodiments are contained in the dependent-claims.

BRIEF DESCRIPTION OF THE DRAWING

In the following the invention will be further explained with reference to the exemplary embodiments shown in the accompanying drawings in which.

DESCRIPTION OF THE PREFERRED EMBODIMENTS

Figure 1:
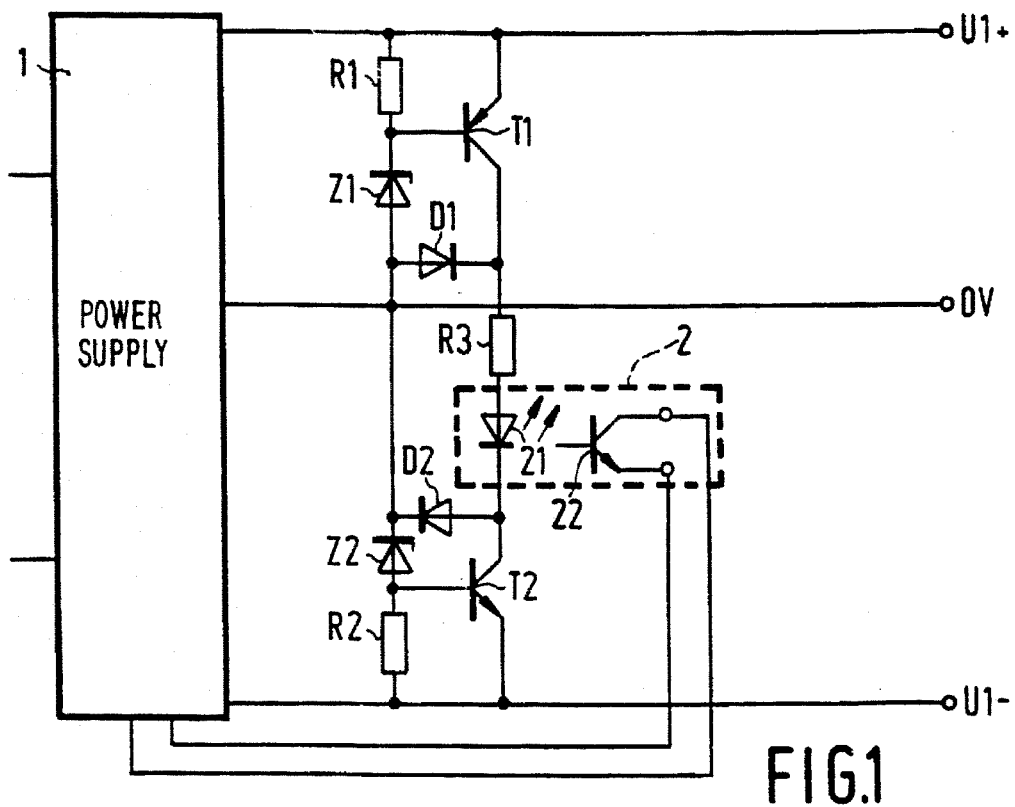
FIG. 1 shows a power supply arrangement comprising an overvoltage monitoring circuit for two direct voltages of different polarities.

In the exemplary embodiment shown in FIG. 1, a power supply arrangement 1 generates a direct voltage U1+ which is positive with respect to a reference potential OV and a direct voltage U1− which is negative with respect to this reference potential. The positive pole of the direct voltage U1+ is connected to the emitter and through a resistor R1 to the base of a PNP transistor T1. The base of the transistor T1 is connected to the cathode of a zener diode Z1, whose anode is connected to the reference potential OV. The anode of a diode D1 is connected to the reference potential OV and its cathode is connected to the collector of transistor T1. The negative pole of the direct voltage U1− is connected to the emitter and through a resistor R2 to the base of an NPN transistor T2. The base of the transistor T2 is connected to the anode of a zener diode Z2 whose cathode is connected to the reference potential OV. The cathode of a diode D2 is connected to the reference potential OV and its anode is connected to the collector of the transistor T2. Between the collector of the transistor T1 and the collector of the transistor T2 is a signal transmission element consisting of as an optocoupler 2 in series with a dropping resistor R3. A light-emitting diode 21 is arranged such that its cathode is connected to the collector of the transistor T2. The optocoupler 2 is connected to a control arrangement of the power supply arrangement 1 so that the direct voltages U1+, U1− of the power supply arrangement 1 are adjusted back or switched off completely by means of a photocurrent produced in a photodiode 22 when the light-emitting diode 21 is emitting.

If the power supply arrangement has a normal operation, i.e. if with a positive direct voltage U1+ no overvoltage occurs, a current flow will be created through resistor R1 across the reverse biased zener diode Z1. The resistor R1, shunted to the base-emitter path of the transistor T1, is dimensioned such that in an undisturbed condition a voltage drop is produced which is smaller than the base-emitter voltage necessary for conduction of the transistor. The transistor T1 is blocked in this fashion. If an overvoltage occurs in the positive direct voltage U1+, the transistor T1 will become conductive via resistor R1 after the base-emitter voltage of approximately 0.6 Volt necessary for conduction is exceeded. The collector current of the transistor T1 now flows through the dropping resistor R3, the light-emitting diode 21 of the optocoupler 2 and the diode D2 to the reference potential OV. The dropping resistor R3 is dimensioned such that the current flowing through the light-emitting diode 21 is sufficient for light emission and the photocurrent produced by the photodiode 22 adjusts the direct voltage U1+ back so that the current is not too high or, alternatively, switches it off. In an embodiment not shown in the Figure a resistor and/or a capacitor is shunted to the signal transmission element 2 to receive a residual current. In a power supply arrangement controlled by means of the signal pulse width, the reduction of the direct voltage U1+ may be realised, for example, by reducing the pulse width of the control signals.

Alternatively, if the overvoltage occurs in the negative direct voltage U1−, the current will flow from the reference potential through the diode D1, the dropping resistor R3, the light-emitting diode 21 of the optocoupler 2 and through the conducting transistor T2 to the direct voltage U1−. In a practical embodiment of the d.c. overvoltage monitoring circuit the value of the direct voltages U1+, U1− is +/−5 volts. The zener voltage of the zener diodes Z1, Z2 is thus dimensioned at 5.1 volts and the resistance of the resistors R1, R2 at 1 kOhm. The accuracy with which the overvoltage monitoring circuit responds is determined only by the tolerances of the zener diodes Z1, Z2 and the base-emitter paths of the transistors T1, T2 and is thus independent of the collector circuit of the transistors T1, T2 and thus is independent of the tolerances of the dropping resistor R3 as well as that of the signal transmission element 2. Consequently, the overvoltage monitoring circuit is preeminently suitable even with requirements as to enhanced accuracy of response.

Figure 2:
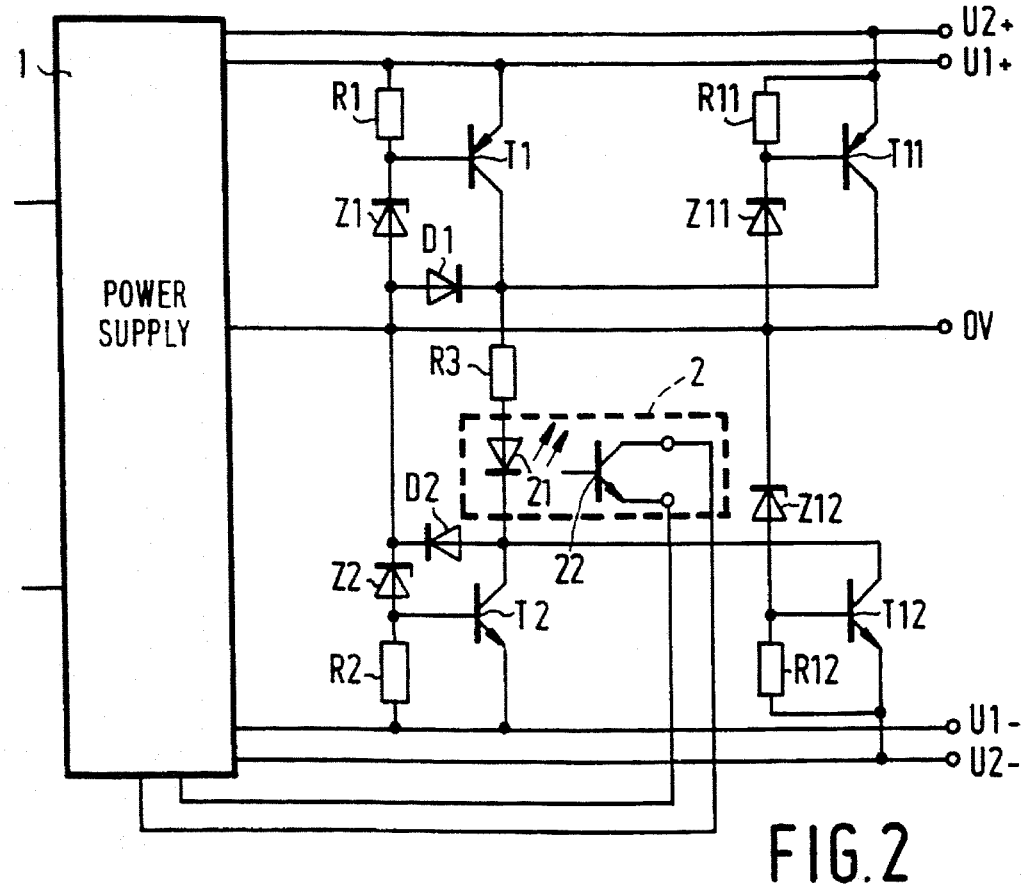
FIG. 2 shows a power supply arrangement comprising an overvoltage monitoring circuit for two positive and two negative direct voltages.

In the exemplary embodiment shown in FIG. 2, two more direct voltages U2+, U2− are monitored in addition to the direct voltages U1+, U1− of the exemplary embodiment shown in FIG. 1. For this purpose, the positive pole of the direct voltage U2+ is connected to the emitter and through a resistor R11 to the base of a PNP transistor T11. The base of the transistor T11 is connected to the cathode of a zener diode Z11 whose anode is connected to the reference potential 0V. Accordingly, the negative pole of the direct voltage U2− is connected to the emitter and through a resistor R12 to the base of an NPN transistor T12. The base of the transistor T12 is connected to the anode of a zener diode Z12 whose cathode is connected to the reference potential 0V. The zener voltages of the zener diodes Z11, Z12 are selected in accordance with the voltage values of the direct voltages U2+, U2−. With the aid of the overvoltage monitoring circuit represented in FIG. 2 each of two direct voltages of different polarities may be monitored and with little additional cost of circuitry.

If in addition to the direct voltages U1+, U1−, U2+, U2− further direct voltages of different polarities are to be monitored, the circuit shown in FIG. 2 merely needs to be extended by an arrangement of a transistor, a resistor and a zener diode, while the signal transmission element 2 is used for all direct voltages. In an embodiment the signal transmission element 2 is arranged as an optocoupler having a thyristor output.

Figure 3:
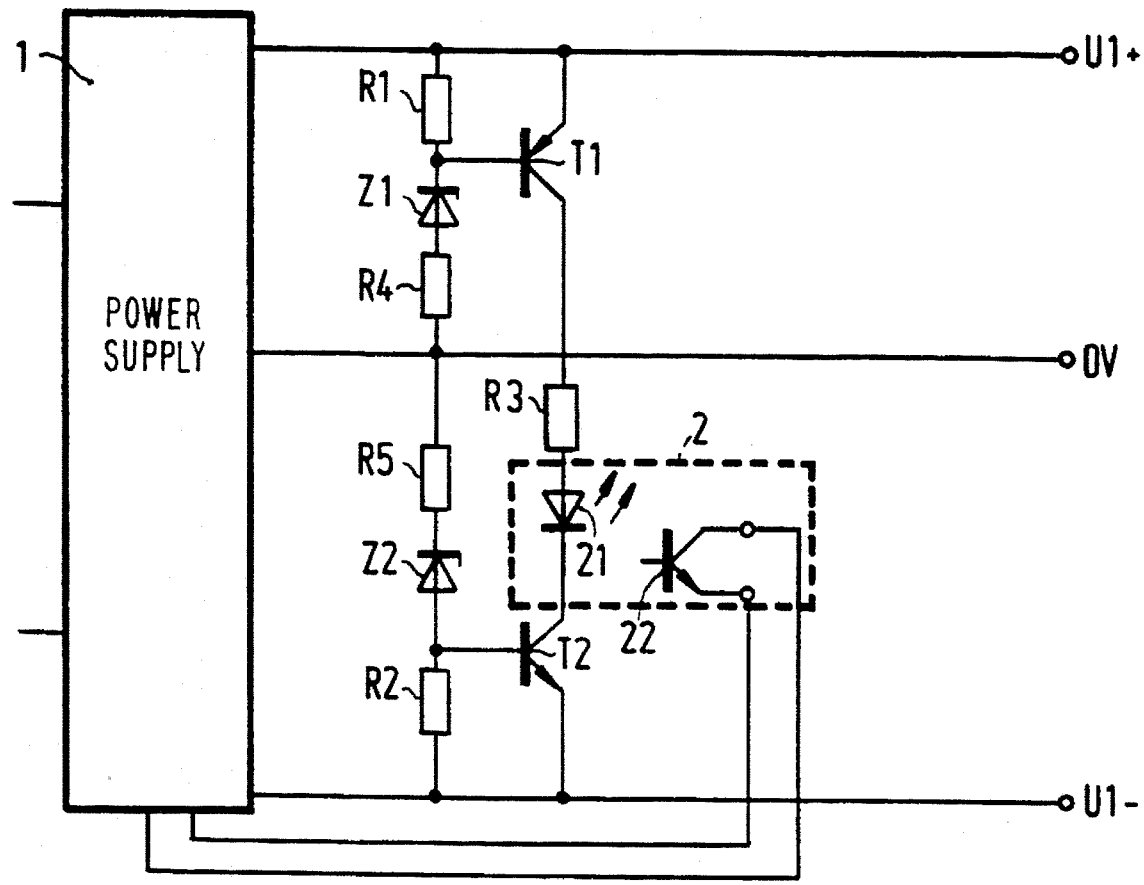
FIG. 3 shows a power supply arrangement comprising an undervoltage monitoring circuit for two direct voltages of different polarities.

In the exemplary embodiment shown in FIG. 3, a power supply arrangement provides the direct voltage U1+ which is positive with respect to the reference potential 0V and the direct voltage U1− which is negative with respect to this reference potential. The positive pole of the direct voltage U1+ is connected to the emitter and through the resistor R1 to the base of the transistor T1. The base of the transistor T1 is connected to the cathode of the zener diode Z1 whose anode is connected to the reference potential 0V through a resistor R4. The negative pole of the direct voltage U1− is connected to the emitter and through the resistor R2 to the base of the transistor T2. The base of the transistor T2 is connected to the anode of the zener diode Z2 whose cathode is connected to the reference potential 0V through a resistor R5. Between the collector of the transistor T1 and the collector of the transistor T2 the signal transmission element 2 is inserted via a dropping resistor R3. A light-emitting diode 21 is arranged such that its cathode is connected to the collector of the transistor T2. The optocoupler 2 is connected to a control circuit of the power supply arrangement 1 so that, when the light-emitting diode 21 does not emit, the direct voltages U1+, U1− of the power supply arrangement 1 are adjusted accordingly or switched off as a result of the photocurrent that is no longer generated in the photodiode 22.

The resistors R1, R2, R4, R5 and the zener diodes Z1, Z2 are dimensioned such that in normal operation, i.e. when no undervoltage occurs, the transistors T1, T2 are conductive. For this purpose the voltage drop at the resistors R1, R2 is to be larger than the base-emitter voltage of approximately 0.6 Volt necessary for conduction of the transistors T1, T2. The collector current of transistor T1 then flows through the dropping resistor R3 across the light-emitting diode 21 of the optocoupler 2 and the likewise conductive collector-emitter path of the transistor T2 to the negative pole of the direct voltage U1−. The dropping resistor R3 is dimensioned such that the current flowing through the light-emitting diode 21 is sufficient for light emission but, on the other hand, not too much power is dissipated. If an undervoltage occurs in the positive direct voltage U1+, the transistor T1 will be blocked at resistor R1 since the base-emitter voltage value necessary for its conduction is now too low. The total power will then flow to the reference potential 0V through resistor R1 and the reverse biased zener diode Z1 and the resistor R4. After the transistor T1 is blocked, current will no longer flow through the light-emitting diode 21 so that there will be no photocurrent passing through the photodiode 22 either and the direct voltage U1+ may, for example, be increased or switched off. In a power supply arrangement controlled by means of signal pulse width, the increase of the direct voltage U1+ may be realised, for example, by increasing the pulse width of the control signals. If, alternatively, the undervoltage occurs at the output having the negative direct voltage U1−, the transistor T2 will be blocked so that in this case too current will no longer flow through the light-emitting diode 21. The total current will then flow from the reference potential 0V via the resistor R5 through the reverse biased zener diode Z2 and the resistor R2 to the negative pole of the direct voltage U1−.

The accuracy with which the undervoltage monitoring circuit responds is determined merely by the tolerances of the zener diodes Z1, Z2, resistors R4, R5 and the base-emitter paths of the transistors T1, T2 in the exemplary embodiment shown in FIG. 3, and is therefore independent of the collector circuit of the transistors T1, T2 and thus is independent of the tolerances of the dropping resistor R3 as well as the signal transmission element 2. Therefore, the undervoltage monitoring circuit shown in FIG. 3 is preeminently suitable in the case of requirements as to enhanced accuracy of response.

I claim:

1. A monitoring circuit for a power supply arrangement which produces at least two different-polarity direct voltages referred to a common reference potential, said monitoring circuit comprising, a signal transmission element, a first and second series connection each including a zener diode and a resistor connected in shunt to a respective direct voltage, a first and second transistor, a first electrode of each transistor being connected to a respective first and second connecting terminal of the signal transmission element and a second electrode to a respective positive and negative pole of the direct voltages, a first terminal of each zener diode being connected to a base of a respective transistor and a second terminal of each zener diode being connected to the common reference potential in a manner such that each zener diode is decoupled from the first electrode of its respective transistor.

2. A monitoring circuit as claimed in claim 1 further comprising first and second diodes which couple the first and second connecting terminals, respectively, of the signal transmission element to the common reference potential.

3. A monitoring circuit as claimed in claim 2 wherein the signal transmission element comprises an optocoupler.

4. A monitoring circuit as claimed in claim 2 wherein the zener diodes are reverse biased so as to operate as a voltage threshold device to be switched on and off as a function of their respective direct voltages.

5. A monitoring circuit as claimed in claim 2 wherein a resistor and/or a capacitor is coupled in shunt with the signal transmission element.

6. A monitoring circuit as claimed in claim 2 further comprising, a resistor connected in series with the signal transmission element and with the zener diodes connected so that base currents for the first and second transistors flow to the common reference terminal via respective current paths that include the respective zener diodes but exclude the signal transmission element, the resistor and a respective one of the first and second diodes.

7. A monitoring circuit as claimed in claim 1, further comprising a perspective resistor connected between each zener diode and the reference potential.

8. A monitoring circuit as claimed in claim 7 wherein the first electrode of each transistor comprises its collector and the second electrode comprises its emitter.

9. A monitoring circuit as claimed in claim 7 wherein the zener diodes are reverse biased.

10. A monitoring circuit as claimed in claim 1 wherein the first electrode of each transistor comprises its collector and the second electrode comprises its emitter.

11. A monitoring circuit as claimed in claim 1 wherein a resistor and/or a capacitor is coupled in shunt with the signal transmission element.

12. A monitoring circuit as claimed in claim 1 wherein the signal transmission element is coupled to a control circuit for adjusting the direct voltages of the power supply arrangement.

13. A monitoring circuit as claimed in claim 1 wherein said first electrode is the collector and each zener diode is decoupled from the collector of its respective transistor by means of a respective diode.

14. A voltage monitor circuit for a power supply having at least first, second and third outputs supplying a positive direct voltage, a negative direct voltage and a common voltage, respectively, said voltage monitor circuit comprising:

means connecting a first transistor, a signal transmission element and a second transistor in a first series circuit between said first and second power supply outputs, a first resistor and a first zener diode connected in a second series circuit between said first and third power supply outputs and with a first junction point between the first resistor and the first zener diode connected to a base electrode of the first transistor such that base current for the first transistor flows to the third output via a current path that includes the first zener diode, but excludes the signal transmission element, and a second resistor and a second zener diode connected in a third series circuit between said second and third power supply outputs and with a second junction point between the second resistor and the second zener diode connected to a base electrode of the second transistor such that base current for the second transistor flows to the third output via a current path that includes the second zener diode, but excludes the signal transmission element.

15. A voltage monitor circuit as claimed in claim 14 further comprising:

a first diode connected in a fourth series circuit with said first transistor and said signal transmission element between said first and third power supply outputs, and a second diode connected in a fifth series circuit with said second transistor and said signal transmission element between said second and third power supply outputs.

16. A voltage monitor circuit as claimed in claim 14 further comprising:

a first diode connected between said third power supply output and a third junction point between the first transistor and the signal transmission element, and a second diode connected between said third power supply output and a fourth junction point between the second transistor and the signal transmission element.

17. A voltage monitor circuit as claimed in claim 14 wherein said first and second transistors are of opposite conductivity type.

18. A voltage monitor circuit as claimed in claim 14 wherein, said connecting means connects the first series circuit in a current path that shunts at least one of the zener diodes, and said first and second zener diodes are decoupled from collector electrodes of the first and second transistors, respectively.

19. A voltage monitor circuit as claimed in claim 14 further comprising:

a first diode connected in a fourth series circuit with said first resistor and said first zener diode, said fourth series circuit being connected in parallel with the first transistor, and a second diode connected in a fifth series circuit with said second resistor and said second zener diode, said fifth series circuit being connected in parallel with the second transistor.

20. A voltage monitor circuit as claimed in claim 14 wherein said first and second resistors and said first and second zener diodes are chosen so that for normal direct positive and negative voltages between the first and third and second and third power supply outputs, respectively, the first and second transistors are biased into cut-off.

21. A voltage monitor circuit for a power supply having at least first, second and third outputs supplying a positive direct voltage, a negative direct voltage and a common voltage, respectively, said voltage monitor circuit comprising:

means connecting a first transistor, a signal transmission element and a second transistor in a first series circuit, in the order named, between said first and second power supply outputs, a first resistor and a first zener diode connected in a second series circuit between said first and third power supply outputs and with a common terminal of the first resistor and first zener diode connected to a control electrode of the first transistor, a second terminal of the first resistor connected to the first power supply output and a second terminal of the first zener diode connected to said third power supply output via a bidirectional current path, and a second resistor and a second zener diode connected in a third series circuit between said second and third power supply outputs and with a common terminal of the second resistor and second zener diode connected to a control electrode of the second transistor, a second terminal of the second resistor connected to the second power supply output and a second terminal of the second zener diode connected to said third power supply output via a bi-directional current path.

* * * * *